No. 774,290. PATENTED NOV. 8, 1904.
E. E. THOMPSON.
DRAG SAW.
APPLICATION FILED JULY 11, 1904.
NO MODEL. 3 SHEETS—SHEET 1.
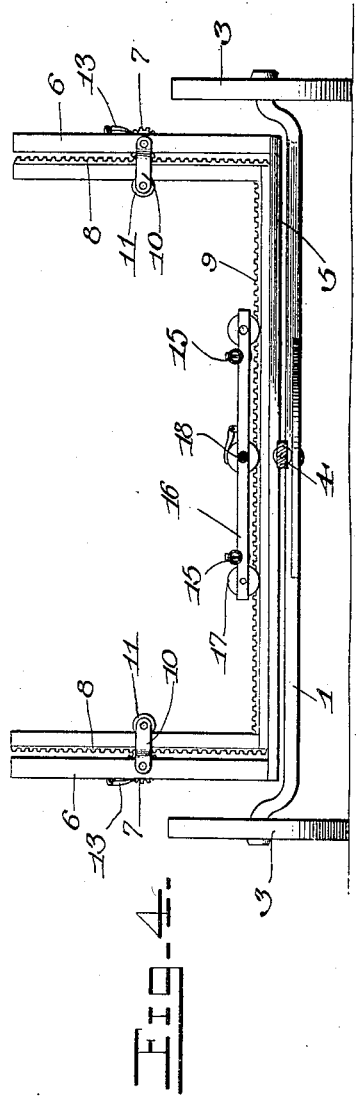
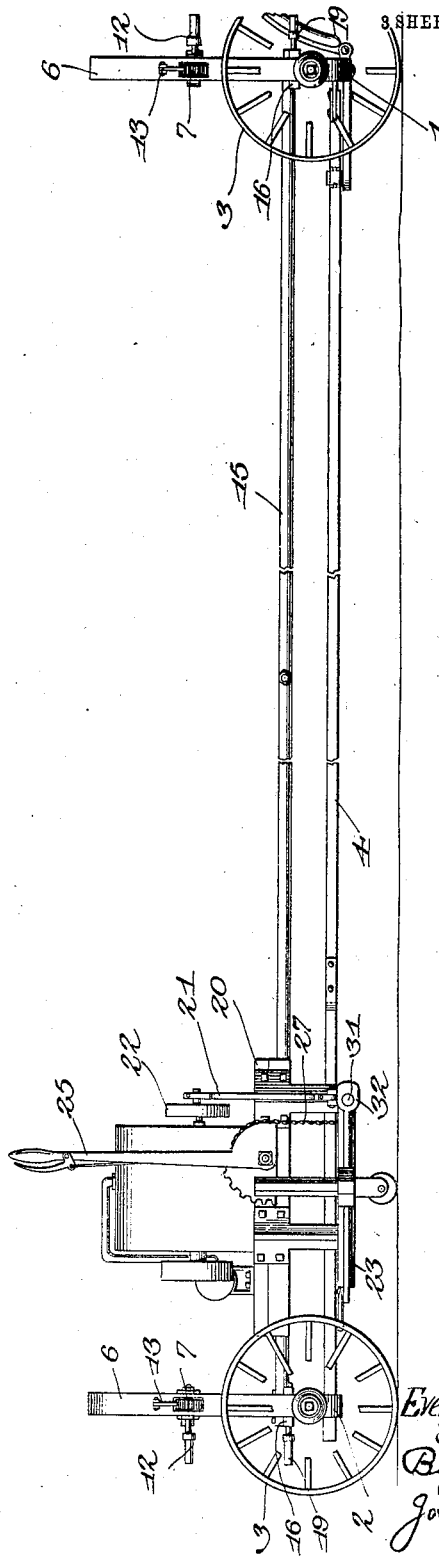
Witnesses
F. E. Alden
S. F. Randolph, Jr.
Everett E. Thompson,
Inventor.
By James K. Polk
Attorney No. 774,290. PATENTED NOV. 8, 1904.
E. E. THOMPSON.
DRAG SAW.
APPLICATION FILED JULY 11, 1904.
NO MODEL. 3 SHEETS—SHEET 2.
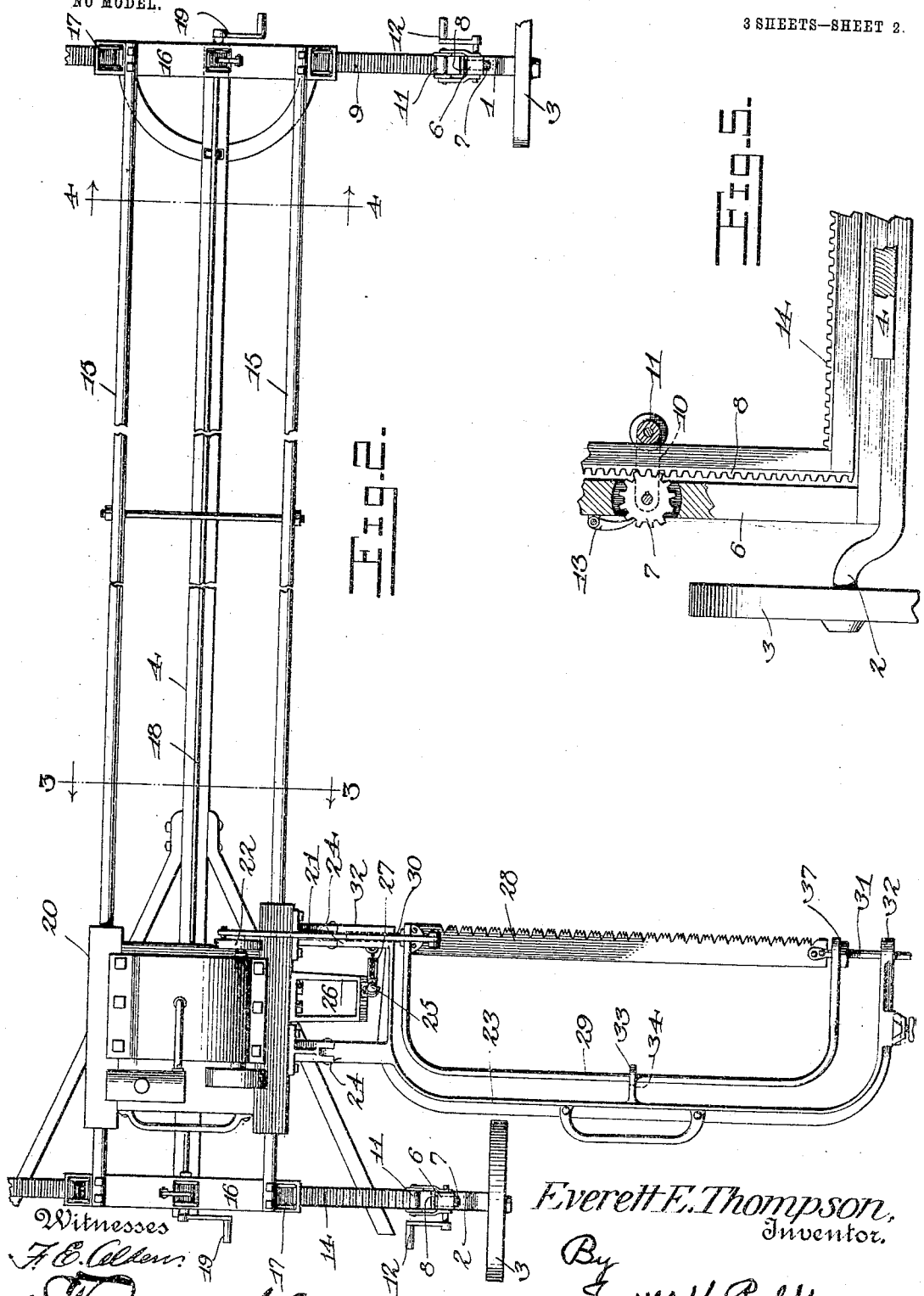

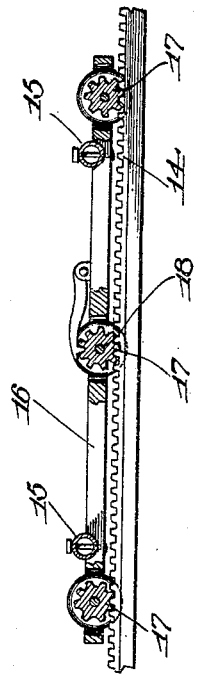

No. 774,290.

Patented November 8, 1904.

UNITED STATES PATENT OFFICE.

EVERETT EDWARD THOMPSON, OF KAUFMAN, TEXAS.

DRAG-SAW.

SPECIFICATION forming part of Letters Patent No. 774,290, dated November 8, 1904.

Application filed July 11, 1904. Serial No. 216,101. (No model.)

*To all whom it may concern:*

Be it known that I, EVERETT EDWARD THOMPSON, a citizen of the United States, residing at Kaufman, in the county of Kaufman, in the State of Texas, have invented certain new and useful Improvements in Drag-Saws, of which the following is a specification.

My invention relates to saws for clearing the ground of trees and stumps; and it consists of a novel construction of mechanism of the character described in which the saw-blade is mounted to reciprocate in a frame that is hung to pass just above the level of the ground and is driven by a motor mounted on a wheel-truck that is supported by a track, which is in turn supported on a truck-frame.

My invention also provides means to raise and lower the ends of the track to overcome the inequalities of the ground being cleared.

The construction, operation, and advantages of my invention will be fully explained hereinafter and by reference to the accompanying drawings, in which—

Figure 1 is a side view in elevation of my invention; Fig. 2, a top plan view; Fig. 3, a view in section of the machine on the line 3 3 looking in the direction of the arrows; Fig. 4, another view in section on the line 4 4 looking in the direction of the arrows; Fig. 5, a detail view of the mechanism for raising and lowering the track; and Fig. 6, a detail view of the means for shifting the track horizontally.

In the drawings similar reference characters represent corresponding parts throughout the several views.

1 represents the front axle, and 2 the rear axle, carrying wheels that travel on the ground, 4 representing a reach-bar connecting axles 1 and 2.

5 represents a bolster swivelly mounted on front axle 1, and 6 uprights secured thereto and also on the rear axle 2.

7 represents gear-pinions journaled on uprights 6 and meshing with rack-bars 8, secured to a horizontal rack-bar 9.

10 represents guide-bars secured to standards 5 and having rollers 11 journaled therebetween that bear against the bars 10 and rollers 11, being to hold said rack-bars in a vertical position. Gear-pinions 7 are operated by cranks 12, a pawl 13 being provided to hold said pinions and rack-bars 8 in position.

14 represents the horizontal rack-bar at the rear of the track.

15 represents two rails, preferably made of tubing, mounted on cross-bars 16, having journaled thereon gear-pinions 17, that mesh with the teeth of rack-bars 9 and 14 at the front and rear of the truck.

The middle pinions on cross-bars 16 are connected by means of a rod 18, that is turned by means of a crank 19 at either end of the truck.

It will be understood from the above description that the rails 15 may be moved from side to side by turning the rod 18 in the direction desired, while both ends of the rails may be raised and lowered by means of the pinions 7 to insure leveling the rails.

20 represents a wheeled truck mounted on rails 15, on which is mounted a motor of any suitable type and having a pitman 21 secured to the crank-disk 22, mounted on the axle of the machine.

23 represents a frame pivotally secured to braces 24, secured to truck 20, said frame being adapted to be raised and lowered by means of lever 25, pivoted on arm 26, secured to said truck-frame and connected by means of chain 27 to frame 23.

Frame 23 carries the saw-blade 28, which is mounted in a frame 29 and slidably mounted in said frame 23 by means of rods 30 and 31, secured to the respective ends of the saw-blade, and said rods 30 and 31 are mounted in eyes 32 in said frame, and a rod 33, secured to the frame, having an eye 34 to receive the frame 29.

35 represents a caster adjustably mounted by means of standard 36 in the cutter end of frame 23 for supporting the free end thereof when in operation.

37 represents a nut mounted on the screw-threaded portion of rod 31 to regulate the tension of the saw-blade 28 in frame 29.

38 represents a handle for manually operating the track 20, and 39 a similar handle secured to frame 23.

Having thus described my invention, what I claim as new is

1. In a drag-saw, a truck, a track mounted thereon, the sawing-machine carried by said track, and means to adjust said track horizontally and vertically, substantially as shown and described.

2. In a drag-saw, truck-axles, a horizontal rack-bar secured to said axles, track-rails, gear-pinions journaled on said rails, means to actuate said pinions to adjust said rails in lateral directions, a truck mounted on said rails, a motor carried by said truck, a saw-frame secured to said truck, a saw reciprocally mounted in said frame, and operative connections between said saw and motor, substantially as shown and described.

3. In a drag-saw, truck-axles, a horizontal rack-bar secured to one of said axles, a bolster secured to the other axle, uprights secured to said bolster, gear-pinions journaled on said uprights, a horizontal rack-bar, vertical rack-bars secured at each end of said horizontal rack-bar and meshing with said gear-pinions, means to actuate said pinions, cross-bars, gear-pinions journaled on said cross-bars and meshing with the horizontal rack-bars, a rod connecting one of the pinions over each of said rack-bars, means to rotate said rod, track-rails mounted on said cross-bars, a truck mounted on said rails, a motor carried by said truck, a saw-frame secured to the truck, a saw reciprocally mounted in said frame, and operative connections between said saw and motor, substantially as shown and described.

In testimony whereof I hereunto affix my signature in presence of two subscribing witnesses.

EVERETT EDWARD THOMPSON.

Witnesses:
CHAS. M. NASH,
FRED HENDERSON.